(No Model.) 2 Sheets—Sheet 1.
J. Q. ADAMS.
WINDMILL.
No. 311,937. Patented Feb. 10, 1885.
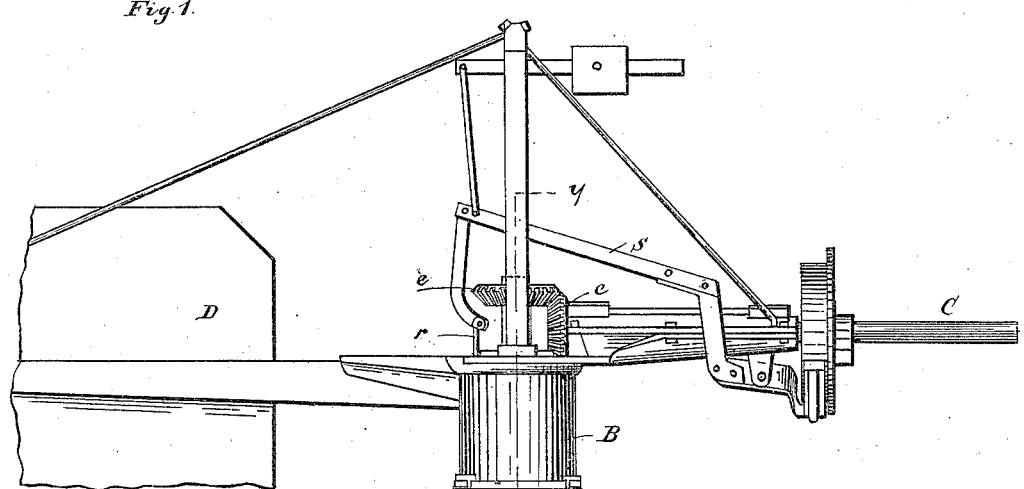
Fig. 1.
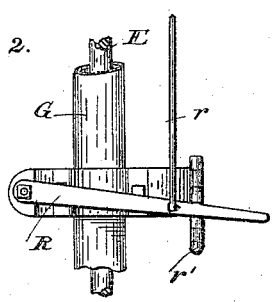
Fig. 2.
Fig. 3.
Fig. 4.
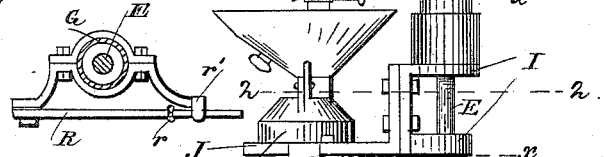
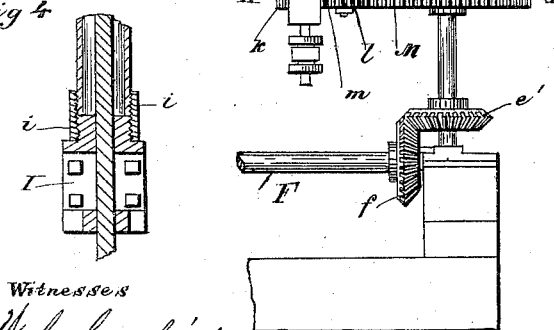
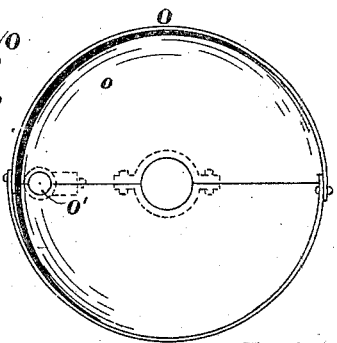
Fig. 5.
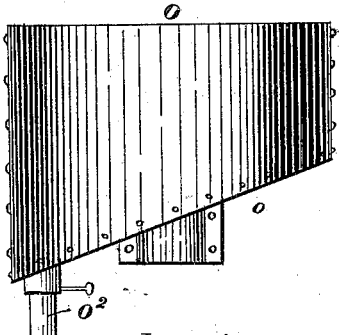
Fig. 6.
Witnesses
W. C. Corlies.
A. M. Best.
Inventor
John Q. Adams
By Coburn & Thacher
Attorneys (No Model.) 2 Sheets—Sheet 2.
J. Q. ADAMS.
WINDMILL.
No. 311,937. Patented Feb. 10, 1885.
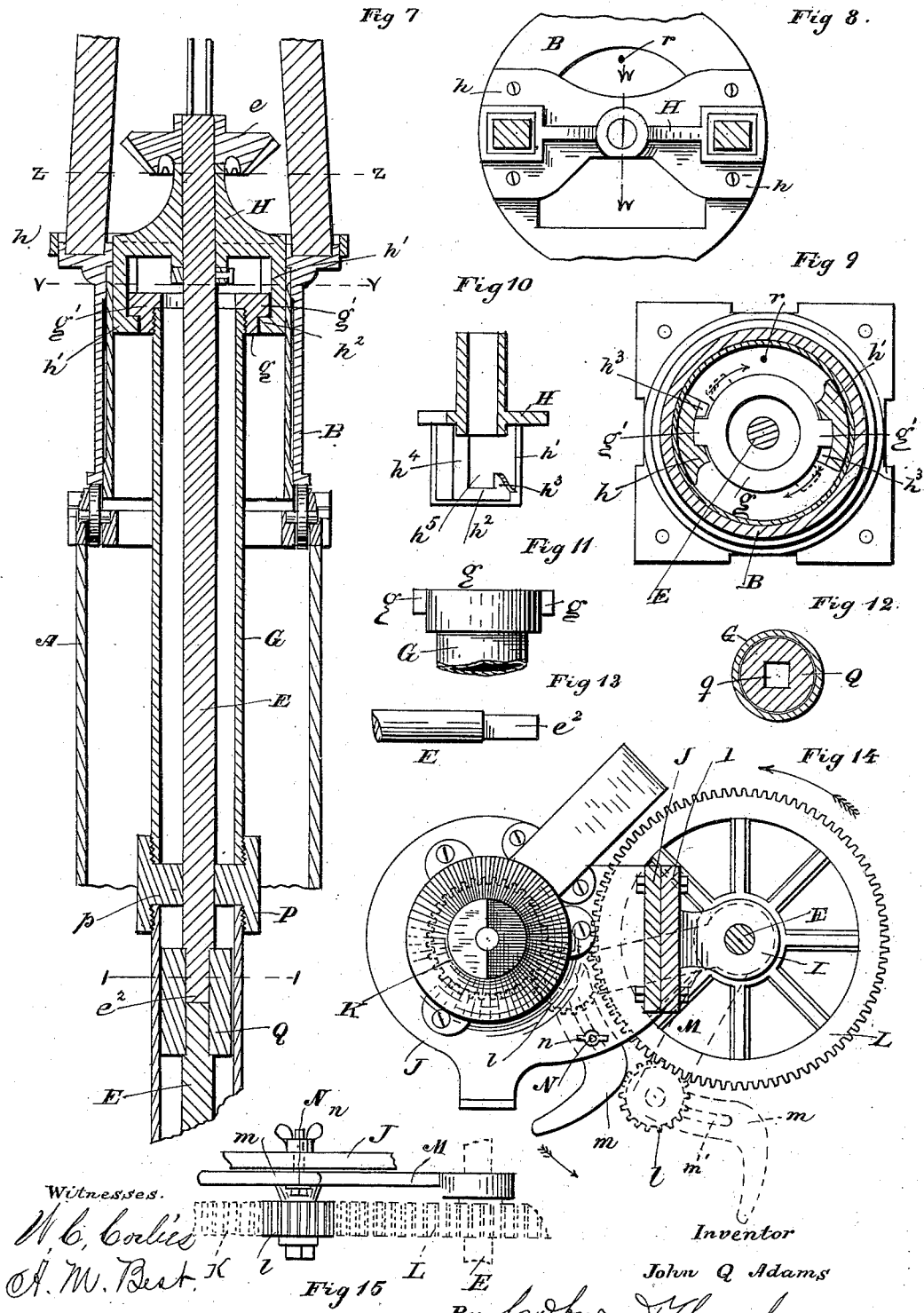
Witnesses.
W. C. Coles
A. M. Best
Inventor
John Q Adams
By Coburn & Thacher
Attorneys

UNITED STATES PATENT OFFICE.

JOHN Q. ADAMS, OF MARSEILLES, ILLINOIS.

WINDMILL.

SPECIFICATION forming part of Letters Patent No. 311,937, dated February 10, 1885.

Application filed March 10, 1884. (No model.)

*To all whom it may concern:*

Be it known that I, JOHN Q. ADAMS, a citizen of the United States, and residing at Marseilles, in the county of La Salle and State of Illinois, have invented certain new and useful Improvements in Windmills, which are fully set forth in the following specification, reference being had to the accompanying drawings, in which—

Figure 1 represents an elevation of a windmill embodying my improvements, the central part of the structure being broken away; Fig. 2, a detail elevation of the brake-lever; Fig. 3, a plan section of the same; Fig. 4, a detail section taken on the line $x$ $x$, Fig. 1; Fig. 5, a plan view of the mill-reservoir detached; Fig. 6, an elevation of the same; Fig. 7, a section taken on the line $y$ $y$, Fig. 1; Fig. 8, a plan section taken on the line $z$ $z$, Fig. 7; Fig. 9, a similar section taken on the line $v$ $v$, Fig. 7; Fig. 10, a detail section on the line $w$ $w$, Fig. 8; Fig. 11, a detail elevation of the upper end of the tube inclosing the shaft; Fig. 12, a plan section taken on the line 1 1, Fig. 7; Fig. 13, a side elevation of one end of the main shaft at the joint; Fig. 14, a plan section taken on the line 2 2, Fig. 1, and Fig. 15 a detail elevation showing the lever-support of the pinion in Fig. 14.

All the figures of the drawings from 1 to 6, inclusive, are on the same scale, and all from 7 to 15, inclusive, are on the same scale, but enlarged from that of the former.

My present invention relates especially to geared windmills or wind-engines, or, in other words, that class of machines in which the main shaft of the windmill is arranged to drive an upright shaft, which in turn communicates motion to other outside machines, such as grinding-mills, saw-mills, &c.

In this class of machines as heretofore constructed usually, as the wind-wheel is turned into work it has a tendency to run around the vertical shaft instead of turning it, the resistance from the grinding-mill or other machine below which is stationary being so great as to tend to prevent the turning of the vertical shaft.

The main object of my present invention is to obviate this difficulty and provide for the continuous operation of the machinery which is to be driven therefrom.

Some attempts to overcome the difficulty mentioned have been made heretofore, but by means of devices, so far as I know, different from mine. There are also some secondary results obtained by my improvement which will appear as the construction and operation of the machine are described.

I will proceed to describe in detail the construction and operation of mechanism in which I have carried out my invention in one way in practical form, and will then point out definitely in the claims the special improvements which I believe to be new and wish to protect by Letters Patent.

Some portions of the machine which may be of any ordinary construction I have not shown in the drawings and shall not describe, and some other parts which are common and may be of any well-known construction I shall only briefly mention as occasion may require for the understanding of the construction and operation of those parts which are new.

In the drawings, A represents a windmill-tower of any ordinary construction, only the upper portion, however, being shown in Fig. 7. On this is mounted the turn-table B, which carries the main or wheel shaft C, and also the vane D. An upright or vertical shaft, E, extends down through the turn-table and within the tower to the machinery below which it is intended to drive. On the upper end of this shaft is a bevel-pinion, $e$, with which a similar pinion, $c$, on the inner end of the wheel-shaft engages. It will be understood, of course, that on the outer end of the wheel-shaft is a wind-wheel of any desired construction. This upright shaft has its upper bearing in the turn-table, which of course moves about it in the usual swing of the vane and wheel.

It is the purpose of my improvement to mount the secondary machine in such a way that it will also move around the upright shaft with the turn-table, and so the relation between it and the main or wheel shaft will always be maintained.

The usual mode of communicating motion from the upright shaft to outside machinery is shown at the lower portion of Fig. 1 of the drawings, and is accomplished by means of the bevel-pinion $e'$, which meshes with a similar pinion, $f$, on a shaft, F, mounted in stationary bearings. It will be seen from this arrangement that as the wind-wheel turns into work, the point of resistance at the lower end of the vertical shaft being stationary, it will tend to overcome the driving-power exerted at the top of the upright shaft and to turn the wheel out of the wind, and thereby lessen its power. This is the action in all ordinary geared wind-engines. This construction (shown in Fig. 1 of the drawings) I have given simply for the purpose of illustration, to show the usual arrangement for communicating motion from the upright shaft to other mechanism or machines. I wish it understood, however, that this mode is no part of my improved construction; but I aim to dispense with it entirely, the shaft F and bevel-wheels $e'$ and $f$ being entirely dispensed with in a mill constructed with my present improvements.

I provide a tube, G, considerably larger than the upright shaft, which it is arranged to surround, and attach this tube to the turn-table, so that it will move around with it. For this purpose I provide a collar, $g$, which is screwed upon the upper end of the tube, and which is provided with trunnions $g'$ on opposite sides thereof. A plate, H, is bolted to the upper face of the turn-table, across which it extends, as shown in Fig. 8 of the drawings. This plate may have flanges $h$, if desired, at each end, which fit over the outside of the turn-table, or it may be made flush with the latter. From the under side of the plate depend two large circular brackets, $h'$, which at their lower ends are provided with inwardly-projecting flanges $h^2$, of such shape and arrangement as to be suitable for seats for the side trunnions on the upper end of the tube. A stud or projection, $h^3$, rises from these seats at one edge of the brackets, being beveled or inclined on its upper face and vertical on its inner face, as shown in Fig. 10 of the drawings, and at or near the opposite edge of the depending bracket is a rib, $h^4$, extending the length of the bracket. It will be seen from this description that a kind of notch or recess, $h^5$, is provided in each of the depending brackets, and these are of such size and form as to be adapted to receive the trunnions of the tube, so that when properly seated therein the tube will be connected to and suspended from the turn-table, and will move therewith, as the projections on each side of the tube-trunnions prevent the tube from moving around independently of the turn-table, and vice versa. The tube is connected to the turn-table by passing the upper end thereof up between the two depending brackets, the tube being turned so that its trunnions will be outside of the former, as shown in dotted lines in Fig. 9 of the drawings. The tube is then turned so as to carry its trunnions toward the beveled projections on the seats of the brackets, over which they will ride and drop into the recesses behind in the position shown in full lines in Fig. 9 of the drawings. It will be understood that to accommodate this operation the beveled projections on the brackets will be arranged on opposite edges thereof as they stand facing each other. Of course it will be understood that the central portion of the turn-table cap is cut away to accommodate the application of the parts just described. It will also be noticed that, although the connection between the tube and turn-table is such as to cause the two to move around together, it is not a rigid connection, but will permit the slight rocking of the turn-table which usually occurs in all windmills under the action of the wind, and without disturbing the vertical position of the tube, which must be maintained. A bracket, I, of yoke shape, is mounted by its two arms on the vertical shaft at the lower end of the tube. This bracket has on the upper face of its upper arm a threaded boss, $i$, and a threaded collar, $i'$, is screwed to this boss and also the lower end of the tube, which is threaded for this purpose. The bracket-yoke is thus firmly attached to the tube, and will turn with it about the shaft. This bracket provides for the attachment of the secondary machine, whatever it may be, to the tube, so that it may be carried thereby.

In the drawings I have shown the application of the improvement to a grinding-mill, and in carrying out the invention I have provided a plate or platform, J, of suitable form and size to support a grinding-mill, K, such as is usually employed in connection with windmills. At one end or side the platform J is bent up to provide an upright section, $j$, which is adapted to fit the central portion of the bracket-yoke I, to which it is firmly secured by bolts $j'$. Obviously the platform or plate J will move with the tube and turn-table, and will carry the grinding-mill with it, as it is mounted thereon. In order to drive the grinding mechanism in this new arrangement, I provide a large spur-gear wheel, L, which is secured to the vertical shaft below the bracket-yoke, and the shaft which drives the grinding devices is extended below the platform and provided with a smaller spur-gear wheel, $k$, arranged in the same horizontal plane with the wheel L. In order to provide for throwing the grinding-mill into and out of gear with the windmill, I do not arrange these two spur-wheels so as to mesh directly with each other, but I provide a small spur-pinion, $l$, which is mounted on an arm, M, secured loosely to the vertical shaft above the wheel L, and by its vibration about the shaft providing for throwing the two wheels L and $k$ into and out of gear, as shown in Fig. 14 of the drawings. This arm M is arranged with reference to the gears with which it engages, so that the revolution of the gear M will have a tendency to throw the arm outward and disengage the pinion from the wheel of the grinding-mill, the pinion being always in mesh with the large wheel on the vertical shaft. This operation will be readily understood from Fig. 14 of the drawings, in which the wheel M, turning in the direction of the arrow, will obviously have a tendency to throw the pinion outward, so as to disengage the pinion from the wheel $k$.

This is an advantage, for it provides for throwing the mill out of gear automatically simply by releasing the pinion-arm.

In order to fasten the pinion-arm in place to hold the pinion in gear with the grinding-mill, the outer end thereof is bent outward, so as to form an angular portion, $m$, and in this bent extension a slot, $m'$, is cut. A bolt, N, is passed up through this slot and hole in the platform, above the upper end of which it is provided with a nut, $n$, being threaded for this purpose. The outer end of the pinion-arm is bent twice, as shown in Fig. 14 of the drawings, so as to provide a handle by means of which the arm may be moved; and in order to throw the machine into gear, the arm is pushed inward until the pinion engages with the wheel $k$, and is then secured in this position by turning down the nut on the bolt. The machines will be thrown out of gear with each other by simply loosening this nut.

As I have here shown a grinding-mill in connection with my present improvement, I have also shown an additional device or improvement for use in connection therewith. It consists of a large hopper or reservoir, O, which is secured in any suitable way to the tube just above the hopper $k$ of the grinding-mill. It is preferably made in two parts or sections, as shown in Fig. 5 of the drawings, so as to provide for its ready attachment and removal, and the bottom $o$ thereof is inclined outwardly toward the hopper of the grinding-mill, being provided at its lower edge with an opening, $o'$, to which a feed-tube, $o^2$, is applied leading to the grinding-mill hopper. This reservoir is for the purpose of storing up a quantity of grain sufficient to supply the grinding-mill for a considerable length of time, thereby obviating the necessity of closely watching the machine. The feed-tube is of course provided with a valve or gate of some suitable construction, by means of which the flow of the grain from the reservoir to the hopper is regulated as desired.

The tube G, on account of its length, is composed of several sections, more or less. These sections are fastened together in a peculiar manner, so as to provide also a bearing for the vertical shaft within. The ends of the sections are threaded, and a collar, P, is made with a central web, $p$, through the center of which is an opening adapted to receive the shaft. The collar P, on each side of the web, is threaded internally, and thus provides for fastening together the ends of two sections of the tube, as shown in Fig. 7 of the drawings, while at the same time a bearing is provided for the vertical shaft at this point, whereby it is supported and stiffened. It is also desirable to make the vertical shaft E in sections, and for the purpose of connecting said sections a hub or circular block, Q, is made, which is slightly smaller than the interior of the tube. This hub has a central angular hole, $q$, running through it lengthwise, and the ends $e^2$ of the shaft-sections are cut down to correspond to this opening in the hub, into which they are placed, as shown in Fig. 7 of the drawings. It will be seen that the sections of the shaft are thus connected so as to turn together. The lever R, for throwing the wind-wheel into and out of the wind, instead of being mounted on the tower or some other stationary part, is mounted on the tube, as shown in Fig. 2 of the drawings, and is connected by a rod, $r$, to the lever S or other device by means of which the wind-wheel is regulated. It will be seen that by this arrangement the lever, being carried by the tube, always maintains the same relation to the devices above with which it is connected, thereby preventing any twisting or straining of these devices or their connections and obviating the necessity of a swivel. Any suitable ratchet, $r'$, may be provided for holding this lever in any desired position.

It must be obvious from the description above that, as the grinding-mill is fastened to the tube so as to move with the turn-table, there is no tendency to turn the wheel out of the wind when the machines are geared together for work, for the parts all swing about a common center, and there is no fixed point of resistance against which the power of the wind-wheel acts, and which would tend to turn it out of the wind, as in the usual construction. The full force or power of the wind-wheel is therefore made effective to drive the grinding-mill or other machinery which is connected to the windmill.

It will be obvious to any one that in very many details of construction changes may be made without modifying the main features of my invention. I wish it to be understood, therefore, that I do not limit myself to the particular devices or particular construction and arrangement of devices herein shown and described; and I also wish it to be distinctly understood that I do not limit myself to the application of my improvement to a grinding-mill; but I claim the main features of the invention when applied to any secondary machine or mechanism which is capable of being mounted or connected to the tube or other like device, so as to move with the turn-table about the upright driving-shaft.

Having thus described my invention, what I claim as new, and desire to secure by Letters Patent, is—

1. In a geared windmill, a tube surrounding the vertical shaft and attached to the turn-table, in combination with a secondary machine carried by the tube, substantially as and for the purposes set forth.

2. In a geared windmill, a tube surrounding the vertical shaft and provided with trunnions at its upper end, in combination with a turn-table provided with depending brackets in which seats are made adapted to receive the tube-trunnions, substantially as and for the purposes set forth.

3. The turn-table B, in combination with the plate H, depending brackets $h'$, provided with a flange, $h^2$, inclined studs $h^3$, and ribs $h^4$, and the tube G, provided with trunnions $g'$, substantially as and for the purposes set forth.

4. The turn-table B, in combination with the tube G, attached thereto at its upper end, the bracket-yoke I, mounted on the vertical shaft and attached to the lower end of the tube, and the platform J, attached to the bracket-yoke, substantially as and for the purposes set forth.

5. The turn table B, in combination with the vertical shaft E, the sectional tube G, attached to the turn-table, and the collars P, provided with a central web, $p$, adapted to form a bearing for the vertical shaft, substantially as and for the purposes set forth.

6. The tube G, in combination with the sectional vertical shaft E and the hub Q, provided with a central angular hole adapted to receive similarly-formed ends of adjacent sections of the shaft, substantially as and for the purposes set forth.

7. The turn-table, in combination with the tube connected thereto, the lever R, mounted on the tube, and mechanism for regulating the wind-wheel, connected to said lever, substantially as and for the purposes set forth.

8. The turn-table, in combination with the vertical shaft, the tube surrounding said shaft and attached to the turn-table, the platform connected to the lower end of the tube, a spur-wheel fixed on the vertical shaft, a spur-wheel on the shaft of the secondary machine, an arm mounted loosely on the vertical shaft, and a pinion mounted on said arm, whereby the two wheels may be connected and disconnected by the vibration of the arm, substantially as and for the purposes set forth.

9. The vertical shaft, in combination with the spur-wheel L, attached thereto, the tube surrounding said shaft and connected to the turn-table, the spur-wheel $k$, carried by the tube, the pinion $l$, and the arm M, carrying said pinion, mounted loosely on the vertical shaft, whereby the ordinary revolution of the wheel M will tend to swing the arm outward to disengage the pinion from the wheel $k$, substantially as and for the purposes set forth.

10. The vertical shaft, in combination with the gear-wheel L, fixed thereon, the tube surrounding the shaft, the platform connected to the tube, the wheel $k$, mounted on the platform, the pinion-arm M, provided with the slot $m'$, and the bolt N, provided with a fastening-nut, $n$, substantially as and for the purposes set forth.

11. The turn-table, in combination with the tube connected thereto, a grinding-mill attached to and carried by the tube, and the reservoir O, attached to the tube and arranged above the mill, substantially as and for the purposes set forth.

JOHN Q. ADAMS.

Witnesses:
C. L. STINSON,
C. N. WARD.